United States Patent [19]

Michael

[11] 4,025,947

[45] May 24, 1977

[54] VIDEO ASSIGNMENT SYSTEMS

[75] Inventor: Peter Colin Michael, Newbury, England

[73] Assignee: Micro Consultants Limited, England

[22] Filed: May 28, 1974

[21] Appl. No.: 473,354

[30] Foreign Application Priority Data

May 30, 1973 United Kingdom ............ 25720/73

[52] U.S. Cl. .................................. 358/86; 325/308
[51] Int. Cl.² .......................................... H04B 1/06
[58] Field of Search ... 340/166 R, 324 M, 347 AD, 340/347 DA; 179/15 AM, 15 AT, 15 AP, 1 B, 18 GE, 18 GF; 325/308; 358/8; 178/DIG. 13, DIG. 22, DIG. 23

[56] References Cited

UNITED STATES PATENTS

| | | | |
|---|---|---|---|
| 3,049,593 | 8/1962 | Touraton | 179/15 AQ |
| 3,119,105 | 1/1964 | Jepperson | 340/347 AD |
| 3,261,913 | 7/1966 | Reichert | 340/347 DD X |
| 3,263,030 | 7/1966 | Stiefel | 179/15 AT |
| 3,374,416 | 3/1968 | Hall | 328/59 |
| 3,419,819 | 12/1968 | Murakami | 340/347 AD |
| 3,723,879 | 3/1973 | Kaul | 179/15 AP X |
| 3,900,885 | 8/1975 | Tallent | 358/8 |
| 3,909,839 | 9/1975 | Inaba et al. | 358/8 |

OTHER PUBLICATIONS

Yaohan Chu, "Digital Computer Design Fundamentals," (1962), p. 315.
Hermann Schmid, "Electronic Analog Digital Conversions," (1970), pp. 168–172, 216–219.

*Primary Examiner*—Robert L. Griffin
*Assistant Examiner*—Michael A. Masinick
*Attorney, Agent, or Firm*—William Anthony Drucker

[57] ABSTRACT

An assignment system adapted to accommodate video and audio signals is provided with a digital cross-point switching matrix which is controlled by a control device which enables connections between selected inputs and outputs of said matrix. The input signals are first applied to analog-to-digital converters, from which the signal is converted into serial form before entering the cross-point matrix. The output from the matrix is converted to parallel form and thereafter to an analog signal by digital-to-analog converters. At any one input the color burst information contained on the incoming video signal, is detected and this controls the rate of conversion of the signal into digital form. The horizontal synchronizing pulse information is detected from the incoming signal and is added to the serial data stream in a coded form and after switching of the data is detected and retrieved before reconversion of the data into analogue form.

10 Claims, 13 Drawing Figures

VIDEO ASSIGNMENT SYSTEMS

BACKGROUND OF THE INVENTION

This invention relates to video and audio signal assignment systems.

A video assignment system may be described as a switching matrix in which a number of video sources may be switched to a number of video destinations. It resembles a telephone exchange for use with video signals. Video assignment systems are used in television studios in order to allow the large number of routing paths to be achieved.

A conventional known video assignment system accepts an analog video signal from any source and switches it by means of analog switches to the required destination. There is therefore within the assignment system, a large number of switches or cross points. These cross points allow the analog signal to be either connected or disconnected.

Figure 1:
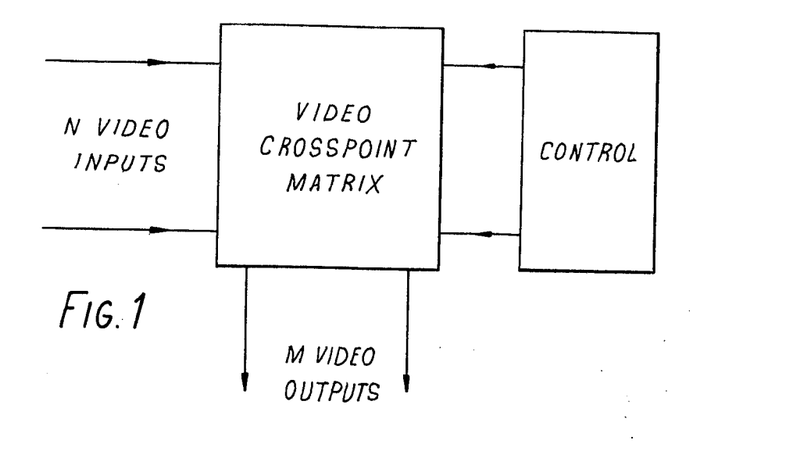
FIGS. 1 and 2 already referred to show respectively a diagram of known video assignment system and a single cross-point therefor.

A diagrammatic form of a video assignment system using analog techniques is shown in FIG. 1 of the accompanying drawings. The analog video inputs of which there are $n$ in this particular example are applied to one axis of the video cross-point matrix. The video cross-point matrix allows any one of those $n$ inputs to be switched to any one or more of the $m$ video outputs. There is therefore a complete matrix within the video cross-point which contain $n$ multiplied by $m$ cross-points.

The control of the video cross-point matrix is undertaken on the basis of time and other control information. The sources and destinations need to be switched at particular times to correspond to the requirement of the program generation or the usage of the equipment within the video sysem. Thus at one particular time channel A input will be switched to channel L output and at another time channel A input will be switched to channel K output as an example. There is furthermore certain information which controls the time at which the video signals are switched. This is associated with the nature of the particular video signal being handled. If the equipment is associated purely with television then it is normal to switch the cross-point matrix from one destination to another destination during the vertical interval of the television signal.

Figure 2:
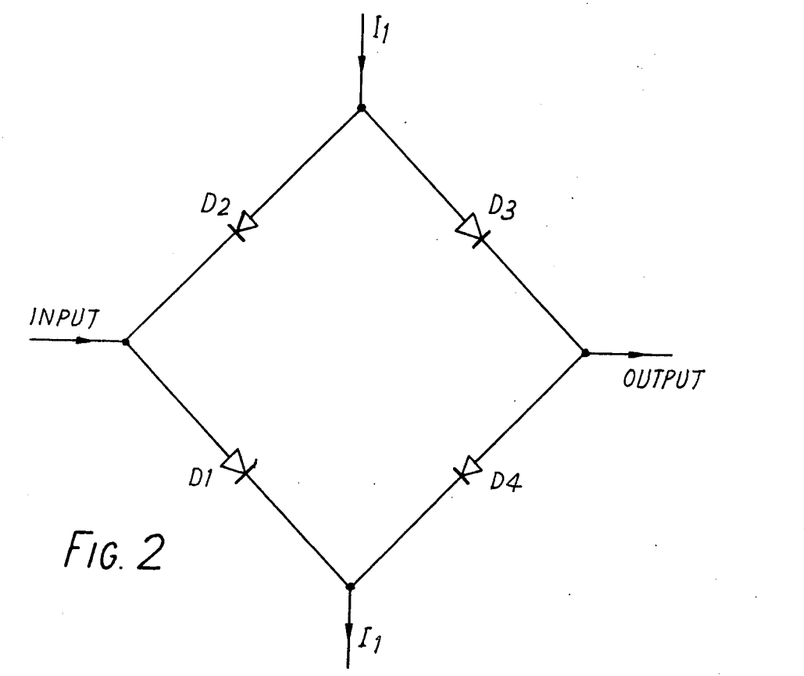

FIG. 2 of the accompanying drawings shows a typical diode switch which may be used for an analog video assignment system using conventional techniques. This switch is either conducting or non conducting depending on whether current I1 is flowing or is not flowing. When current I1 flows diode D1 and D2 are forward biased and diodes D3 and D4 are also forward biased. Provided that the diodes are matched the output is then a replica of the input and has a low resistance. During this condition the switch is in the "on" condition. When I1 is switched off and a reverse bias voltage is applied to the diode bridge the output is isolated from the input via the diode reverse leakage and stray capacity. In this condition the switch is in the "off" condition. In a fully complemented video assignment system with $n$ inputs and $m$ outputs there will be a total of $n$ multiplied by $m$ cross-points of this sort. Associated with each of the cross-points will be a drive current and a method of controlling that current.

The problems which occur in an analog system of the sort described are associated with the leakage which occurs across the cross-point switches. When a large number of these are used in a system, the isolation between the inputs and the outputs becomes very difficult to maintain at the required standard.

The object of this invention is an improvement in the video assignment system. The function of the video assignment system remains unchanged.

SUMMARY OF THE INVENTION

According to the invention there is provided a video and audio signal assignment system for handling incoming signals having horizontal synchronizing pulse and colour burst information thereon said system comprising:

a. a plurality of analog-to-digital converters for receiving and converting said incoming signals into digital form;

b. a plurality of parallel-to-serial converters having their inputs connected to the outputs of the analog-to-digital converters for converting said signals into serial data;

c. a digital cross-point switching matrix connected to the outputs of said parallel-to-serial converters;

d. a plurality of serial-to-parallel converters connected to said cross-point matrix for receiving said serial data;

e. a plurality of digital-to-analog converters connected to said serial-to-parallel converters:

f. a control device for enabling the connection between selected inputs and outputs of said matrix;

g. burst detector means for detecting the colour burst information on said incoming video signals;

h. clocking generator means determining the rate of conversion of said video signal into digital form, said clocking generator conversion rate being controlled by said detected colour burst signal, i. sync detector means for detecting the horizontal sync pulse information on the incoming video signal;

j. switching means in said parallel to serial converter for including said detected sync pulse information into said serial data stream in a coded form, and k. coded sync detector means for detecting and retrieving the coded sync pulse information received by said serial-to-parallel converter.

BRIEF DESCRIPTION OF DRAWINGS

The invention will now be described with reference to the accompanying drawings, in which:-

DESCRIPTION OF THE PREFERRED EMBODIMENT

Figure 3:
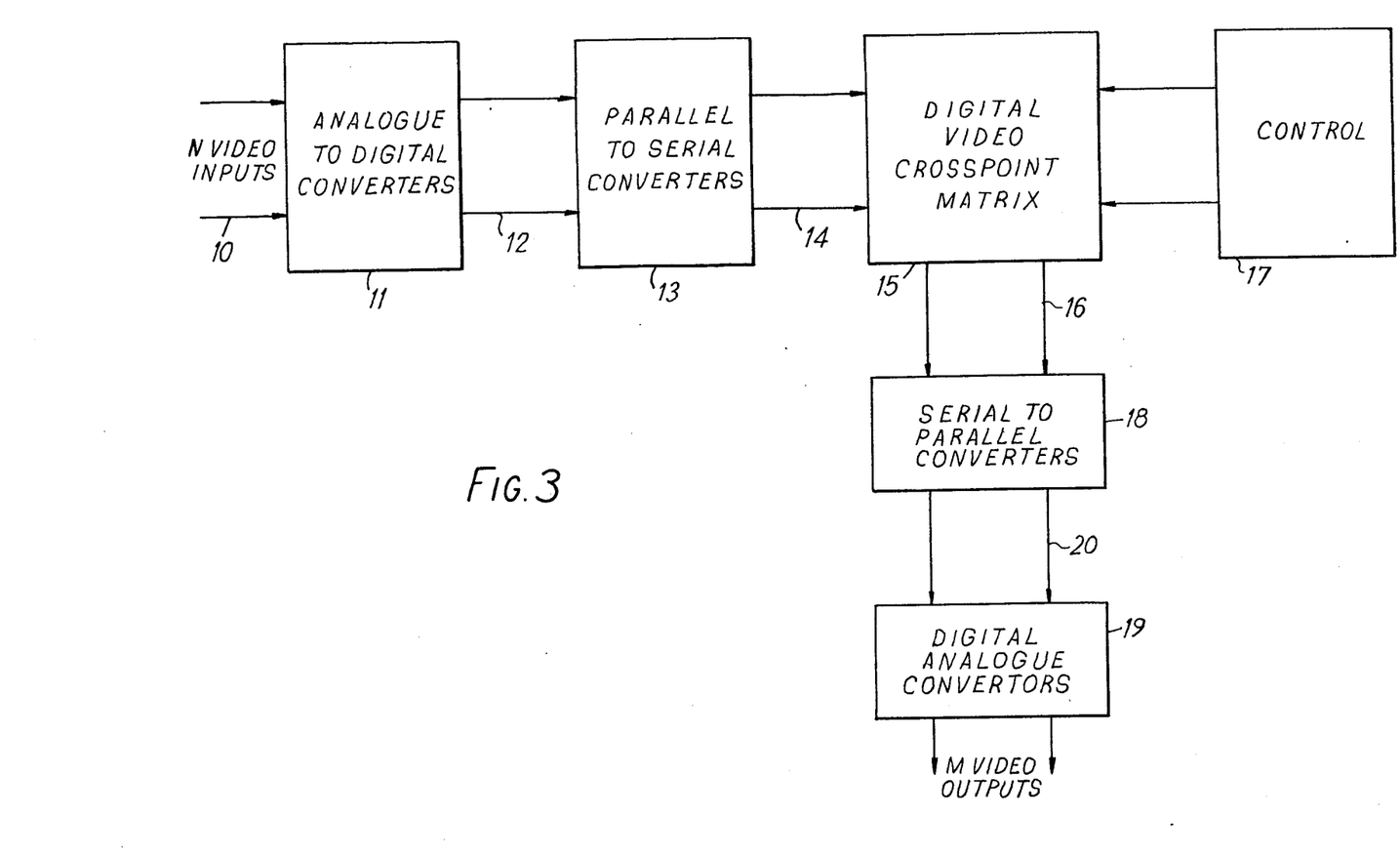
FIG. 3 is a block diagram of the digital video system according to the present invention.

The basis of a digital video assignment system of the present invention is shown in FIG. 3. The video inputs 10 are applied to analog-to-digital converters 11. Each analog input has its own analog-to-digital converter associated with it. The analog-to-digital converter converts the analog signal into a digital signal in which the digital data appears as a digital number on parallel wires 12. For a typical video assignment system there will be between 6 and 12 bits of digital data for each video signal. The means that each digital output has between 6 and 12 wires associated with it. Each wire will have either a logical high 1 or a logical low 0 level on it which is updated at the sampling frequency.

The parallel digital signal is converted to a serial signal in parallel-to-serial converters 13. Each analog video input will have associated with it its own analog-to-digital converter followed by its own parallel-to-serial converter. The parallel-to-serial converter accepts the digital data at its input in parallel form and produces it as a serial data stream on a single wire at its output 14.

An important feature of the invention is that the digital video cross-point switching matrix 15 requires only a single switch for each cross-point in precisely the same way that the analog cross-point system requires only a single switch for each point. In order to achieve this, it is necessary to convert the parallel digital data to serial digital data. This is a function of the parallel-to-serial converters.

In a further aspect of this invention, a modification is described in which instead of a single line per video channel in the digital video cross-point matrix the number of lines is increased to at least 2, so that the design of the digital video cross-point matrix is simplified.

The serial digital data is passed through the digital cross-point matrix and emerges as a serial digital data stream at an output 16 as determined by a control (digital computer) 17. At each output a serial-to-parallel converter 18 accepts the serial data stream and reconverts it to parallel data suitable for application to a digital-to-analog converter 19. The serial-to-parallel converter fulfills the reverse function of the parallel-to-serial converter at each input point.

The data which emerges at the output 20 of the serial-to-parallel converter 18 is therefore a replica of the digital data which emerges at the output 12 of the respective channel of the analog-to-digital converter 11.

In principal there will be one digital-to-analog converter for each output channel. In the system shown, there are *m* video outputs and there will be *m* serial-to-parallel converters.

Figure 4:
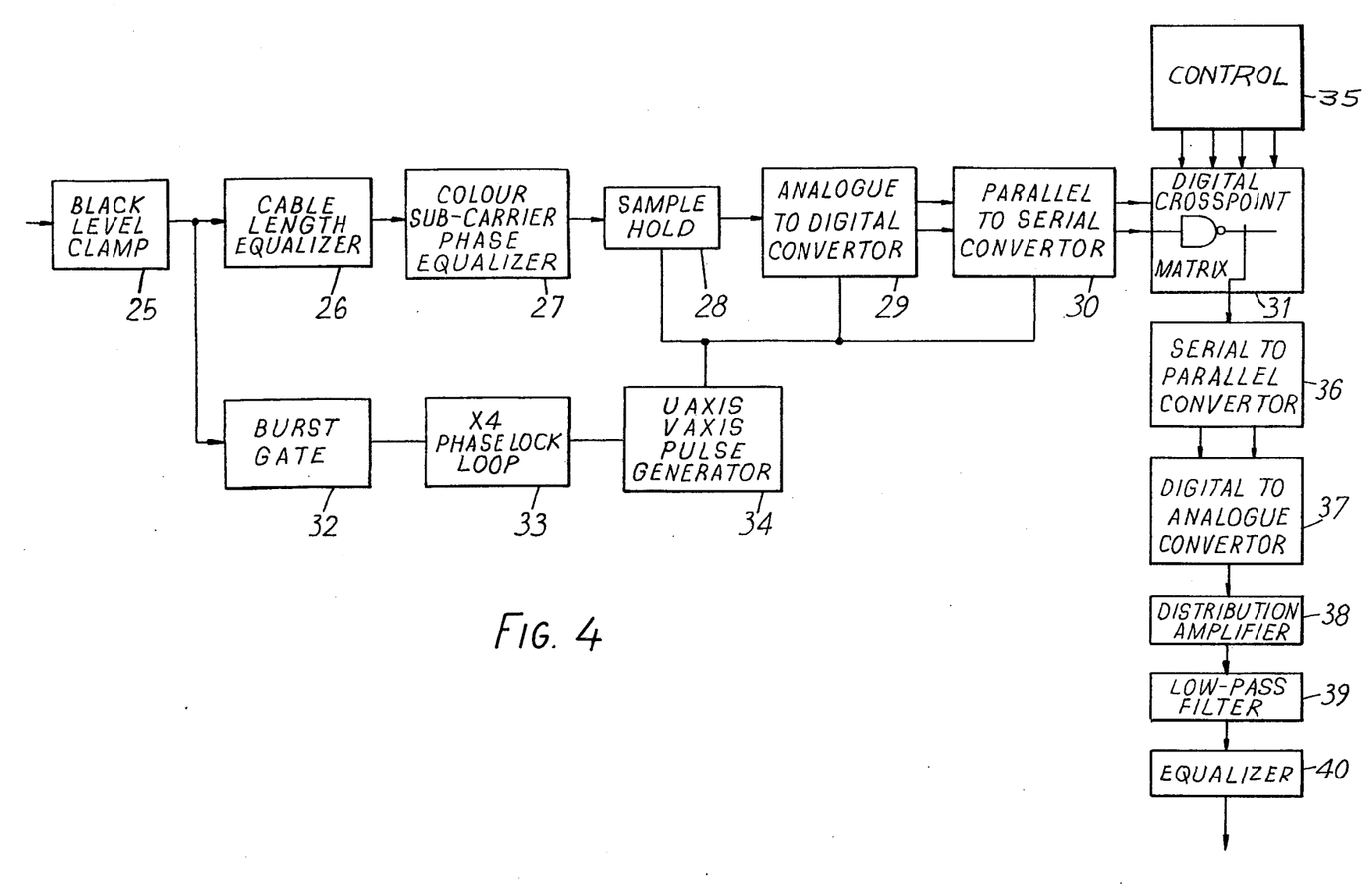
FIG. 4 is a block diagram showing a single path through the assignment system of FIG. 3.

FIG. 4 shows a single path through the video assignment system in more detail, and relates in particular to a colour television signal using PAL system transmission. The video signal is applied through a black level clamp 25 which restores the black level to a fixed voltage adjustable within the black level clamp device. The cable length equalizer 26 is adjusted so that the delays due to the various cable lengths used within the system are compensated.

The color sub-carrier phase equaliser 27 automatically adjusts the phase of the color sub-carrier to be equal for all input channels. The sample hold 28 may be considered as part of the analog-to-digital converter 29 and it is arranged to take a sample from the video signal at a time controlled by a strobe pulse from pulse generator 34. The sampled analog signal is applied to the analog converter which provides a parallel digital word on wires which are taken to the parallel-to-serial converter 30. The analog-to-digital converter is arranged to convert the analog signal from the sample hold unit when a strobe pulse is applied. The parallel-to-serial converter accepts the parallel data from the analog-to-digital converter and converts it into a serial data stream in a way which allows the information to be transmitted on a single wire into the digital cross-point switching matrix 31.

The function of the burst gate 32 is to extract a signal which is similar in frequency and phase to the color sub-carrier burst present on the video singal. In the absence of such a burst being present on the video signal another source of a suitable frequency may be used. A phase locked loop 33 is arranged to run at 4 times the color subcarrier frequency and is locked to the phase of that signal. The pulses generated by the pulse generator 34 on the axis of U and V of the PAL signal are used to operate the sample hold 28, analog-to-digital converter 29 and parallel-to-serial converter 30 simultaneously. This particular aspect of the circuit is entirely specialized to color television systems.

The digital cross point matrix 31 has a control 35 which allows any input to communicate with an output by an address structure. A nominal address structure would incorporate 2 address words, one for X and one for Y. At the output of each of the digital cross-point matrix terminals is a serial-to-parallel converter 36 which accepts the serial data stream and converts it to a parallel data word which is similar in format to that which originated from the output of the analog-to-digital converter 29. The digital-to-analog converter 37 is connected to this digital data word and is arranged to form an analog counterpart of the digital data entered into it. In this way the output from the digital-to-analog converter forms a sampled representation of the original analog signal present at the input to the sample hold unit. The output from the digital-to-analog converter is amplified by the distribution amplifier 38 and then filtered by a low-pass filter 39 so that the components present in the signal due to the sampling operation are reduced. A low-pass filter performs this particular function. At the output of the unit there may be some amplitude/frequency distortion or phase distortion and the equalizer 40 is incorporated to compensate this effect.

Figure 5:
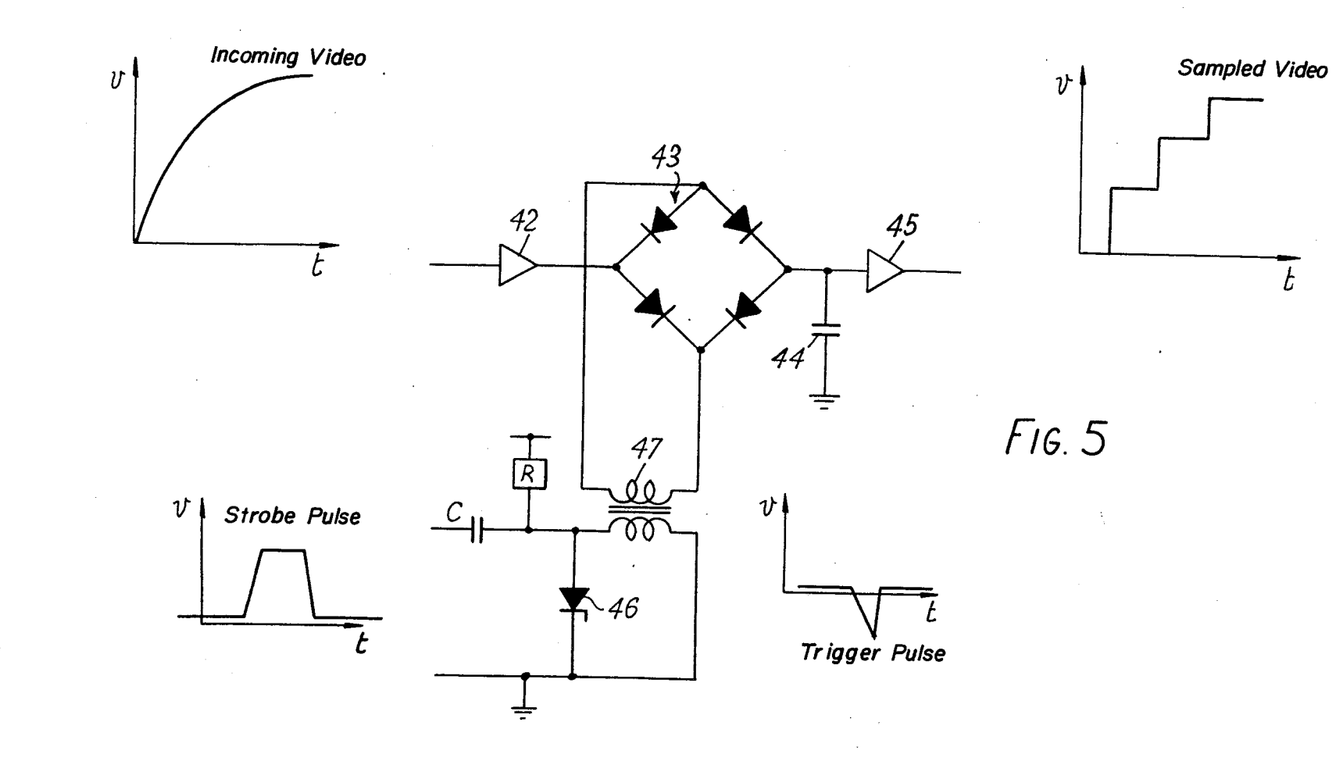
FIG. 5 is a diagram of a sample hold unit being an example suitable for use in the circuit of FIG. 4.

FIG. 5 shows a representation of the suitable sample hold unit. This particular circuit is included to indicate an example of circuitry which may be used. The video input is applied to an amplifier 42 and is switched via a hot carrier diode bridge switch 43 into a memory capacitor at each sampling pulse. The memory capacitor 44 is buffered by a further amplifier 45 and the output appears from the low impedance output of this amplifier. The analog signals shown entering the circuit will then be sampled upon each sampling pulse and the output will appear as seen as a series of steps with levels in between which remain unchanged. The function of this circuit is to provide a constant analog input voltage for a period of time sufficient to allow digitization to occur.

The hot carrier diode bridge is switched on by a short pulse derived from a step recovery diode 46 and driven through a pulse transformer 47. The step recovery diode is a device which may be used to provide a short pulse with very fast rise or fall times.

This short pulse is produced in response to the incoming strobe pulse applied to capacitor C which is received from pulse generator 34.

Figure 6:
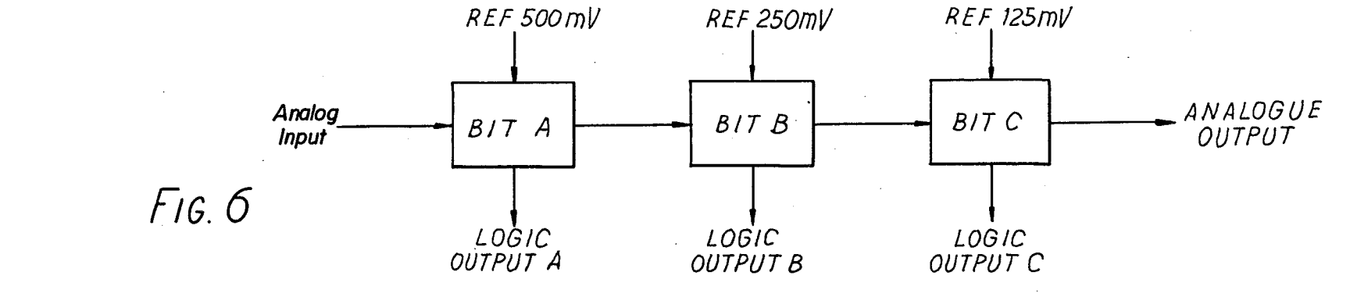
FIG. 6 is a diagram of a highspeed analog-to-digital converter being an example suitable for use in the circuit of FIG. 4.

FIG. 6 shows a basic high speed analog-to-digital converter in diagrammatic form. This circuit and the techniques involved are included to illustrate the sort of circuit which might be used. In FIG. 6, three bits A, B and C of a multi-stage converter are shown together with the waveforms present at the input and output of each bit. This form of analog-to-digital converter represents known techniques and there are many implementations of this particular analog-to-digital converter.

Figure 7:
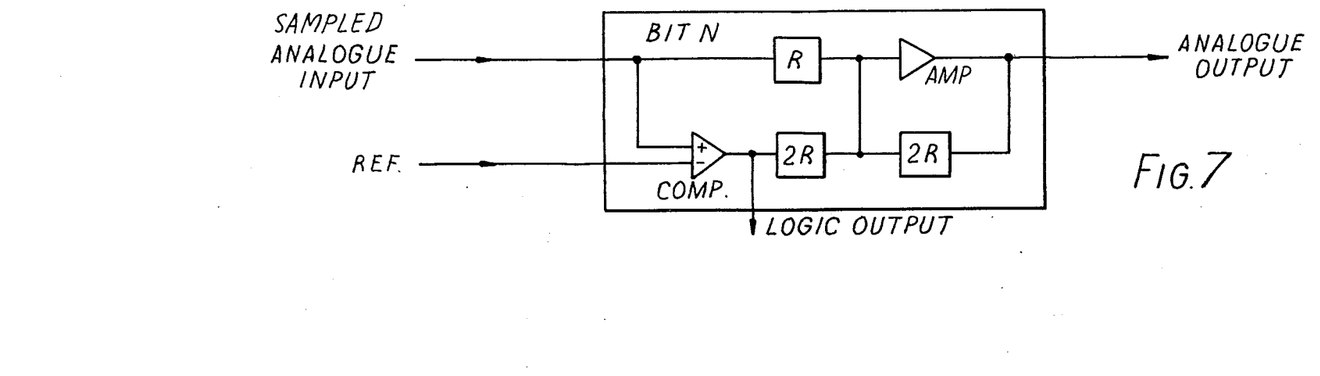
FIG. 7 shows the schematic circuit of one of the bits of the analogue to digital converter of FIG. 6.

FIG. 7 shows the schematic circuit of one of said bits of the converter of FIG. 6. The input waveform entering bit A in FIG. 6 is compared with a reference voltage which represents half full scale deflection. When the comparator observes that the input has passed half full scale, it is arranged to introduce an offset such that the output from bit A is shaped with a sawtooth having a single fall in the centre. This waveform is then applied to bit B which is arranged to compare the input to bit B with a reference voltage of one quarter full scale. When the comparator observes that the input to bit B has passed one quarter full scale an offset is introduced so that the waveform produced at the output to bit B is available for connection to bit C. This process is clearly iterative and the number of bits may be strung in series to form a multistage self balancing analog-to-digital converter.

Figure 8:
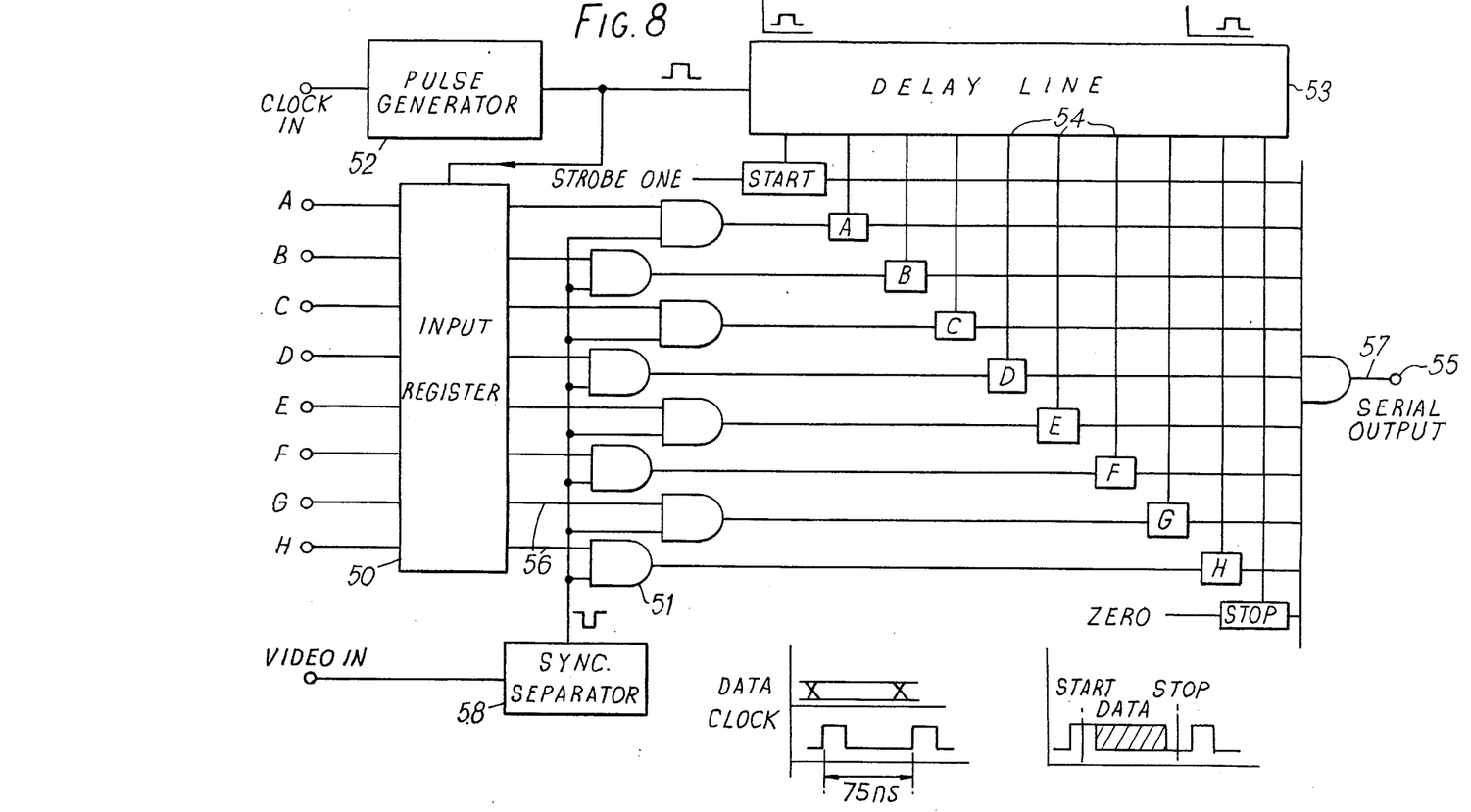
FIG. 8 shows a parallel-to-serial converter being an example suitable for use in the circuit of FIG. 4.

FIG. 8 shows the basis of a high speed parallel-to-serial converter. This circuit is included to illustrate the sort of circuit which might be used. The parallel data from the analog-to-digital converter is arranged to be stored in an input register 50. At the same time a strobe pulse received from generator 34 of FIG. 4 is applied to the clock IN connection which loads the data into the register under the action of pulse generator 52. The data stored in the register is then applied to a series of bistables 51 which have their connections OR'd to the serial output. The pulse generator 52 output is also applied to a delay line 53. The delay line has a number of taps 54 on it and the taps provide a pulse at discrete intervals in time according to the delay line characteristics to make the switches A–H conducting. In this way, the data stored in the input register is applied in turn to the serial output 55 connection and converted from 8 parallel wires 56 to a singel wire 57 which has the data impressed on it in a particular code.

In this particular serializer a sync separator 58 is incorporated which accepts the incoming video input and extracts the sync pulses present on the television waveform. These sync pulses are arranged to present one particular code to the bistables so that it may be identified later as having been caused by a sync pulse.

Figure 9:
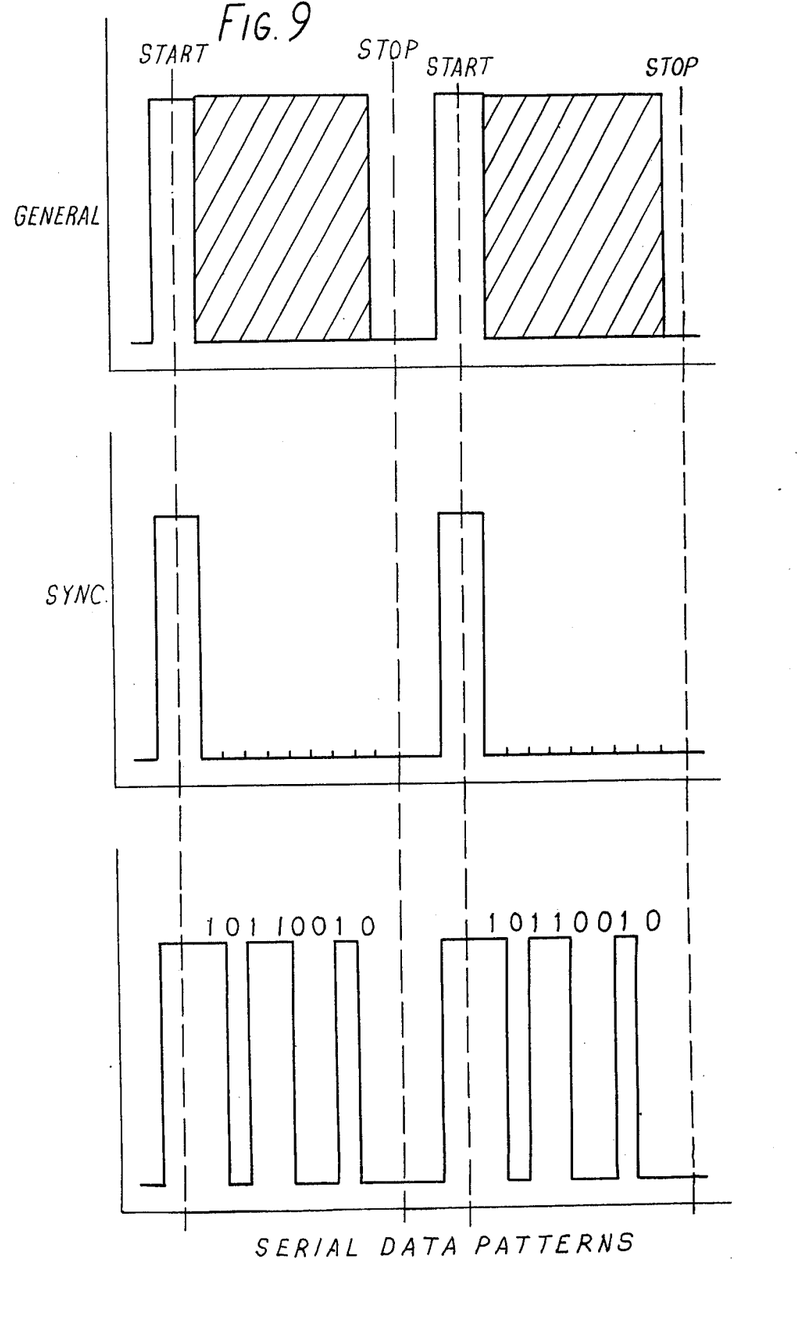
FIG. 9 shows an example of serial data patterns at the output of the parallel-to-serial converter.

FIG. 9 shows the code which is used in this particular serializer. The data to be sent is preceded by a pulse which indicates data that is about to be sent. This pulse is called a "start" pulse. It is always in the same direction and precedes each data word. Following the start pulse is an area which is reserved for data. The data in this area may result in either a high or a low signal being present during that period of general data sampling. Each data word is terminated by a pulse which is always a low level. This pulse is called a "stop" pulse. Thus, in the case when the data is all low, i.e. all digital zeroes, the waveform shown in the centre of FIG. 9 applies. This is the output produced when a horizontal sync pulse is detected on the incoming video. In this particular form the start pulse is followed by a string of zero data pulses and terminated by a zero stop pulse. The next start pulse indicates that the next data word is about to occur.

The serial data pattern shown in the lower diagram of FIG. 9 illustrates the waveform which would occur when one particular bit pattern is present on the output when a horizontal sync pulse is not present. In this case the digital pattern is:-

10110010

This form of data is known as 10 bit asynchronous nonreturn to zero code. It represents the simplest of the codes which may be generated from digital data. It has the advantage that no synchronizing information is required as each data word is fully self contained being initiated by a "start" pulse and terminated by a "stop" pulse.

Figure 10:
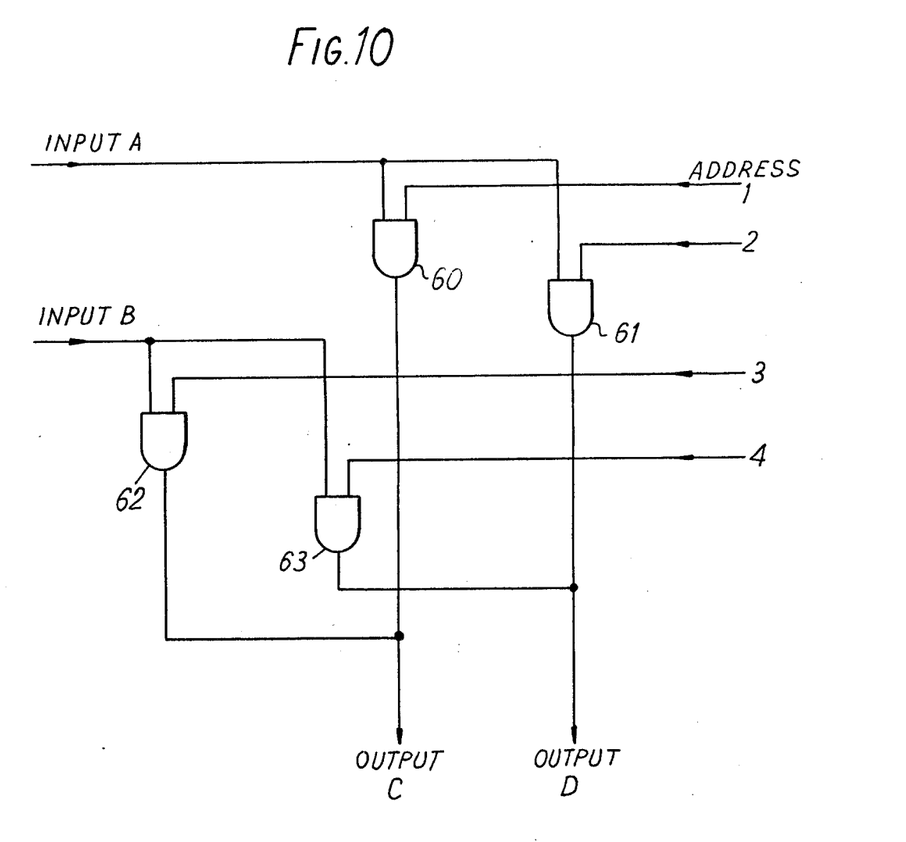
FIG. 10 shows cross-point switches for the connection of two inputs and two outputs of the matrix of the circuit shown in FIG. 4.

FIG. 10 shows a simple digital cross-point switch. In this particular digital switch AND gates 60–63 are used to implement each cross-point. In this illustration there are two digital inputs and two digital outputs. By addressing the line 1, 2, 3 or 4 it may be arranged such that input A communicates with either output C or output D, or alternatively that input B communicates with either output C or output D. This form of digital cross-point switch may be expanded to a large number of inputs and a large number of outputs. The invention is not limited to the circuit as shown which is included to illustrate the sort of circuit which might be used.

Figure 11:
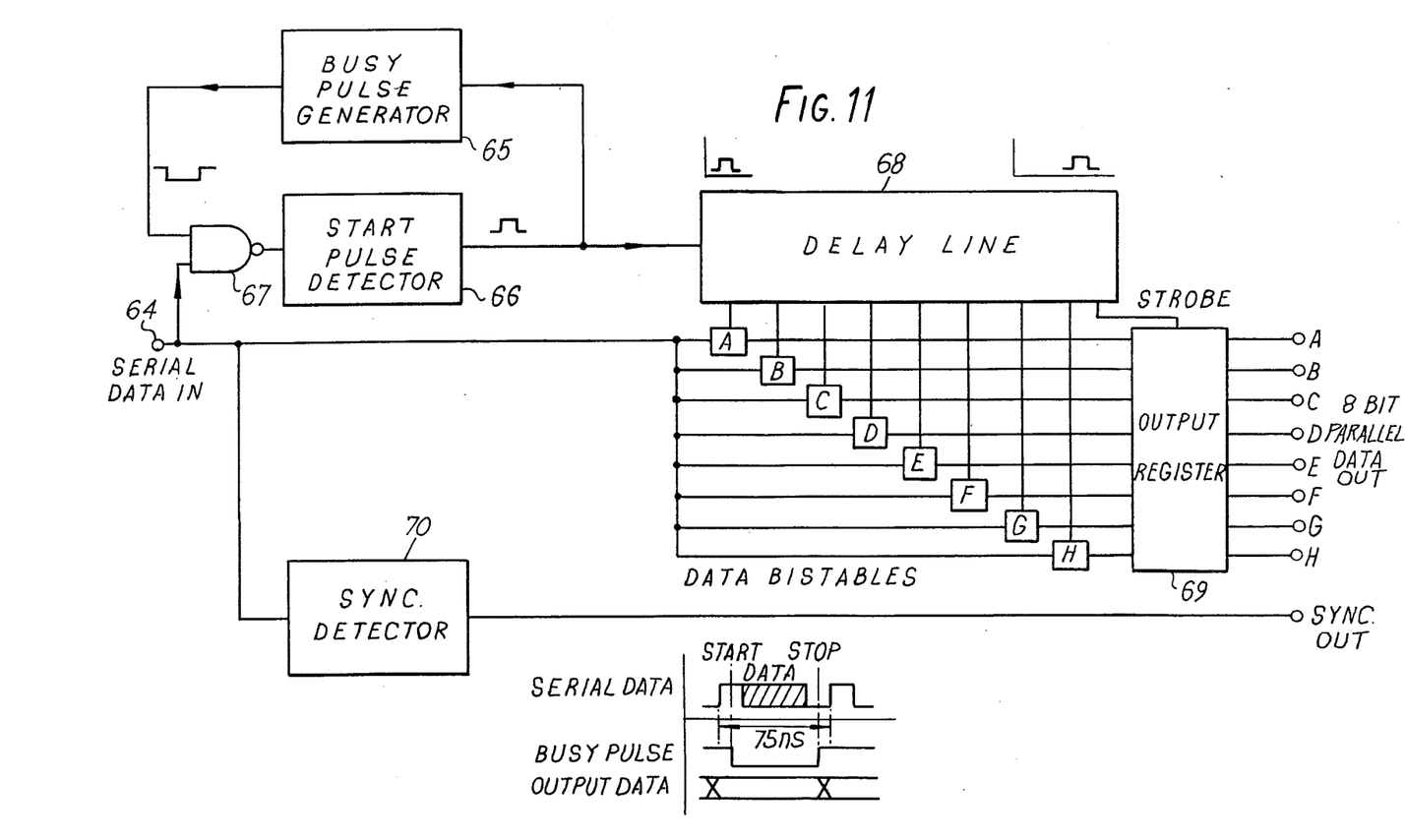
FIG. 11 is a diagram of a serial-to-parallel converter being an example suitable for use in the circuit of FIG. 4.

FIG. 11 illustrates a form of deserializer which may accept the data shown in FIG. 9 generated by the serializer shown in FIG. 8 and which may convert this data into a parallel form suitable for application to a digital-to-analog converter. The serial data enters on the left hand side of the diagram at Ser. Data In 64.

A start pulse detector 66, controlled via a gate 67 having inputs from said Ser. Data In terminal 64 and a Busy pulse generator 65, produces a pulse which is applied to a delay line 68 which matches the characteristics of the delay line used in the serializer. The pulse from detector 66 causes the occurrence of a busy pulse from generator 65 which then locks out any further retriggering from subsequent pulses in that sample. The delay line produces pulses applied to the data bistables A' to H' at discrete intervals of time determined by the delay line characteristics. The serial data is there strobed into the data bistables and is presented in parallel form to the output register 69. When the start pulse has travelled the full length of the delay line and strobed all of the data bistables marked A' to H', it then produces the strobe pulse which updates the output register to produce new parallel data. In this particular circuit a sync detector 70 is incorporated which detects the particular data word which was sent during the sync period and uses this externally to this circuit.

Figure 12:
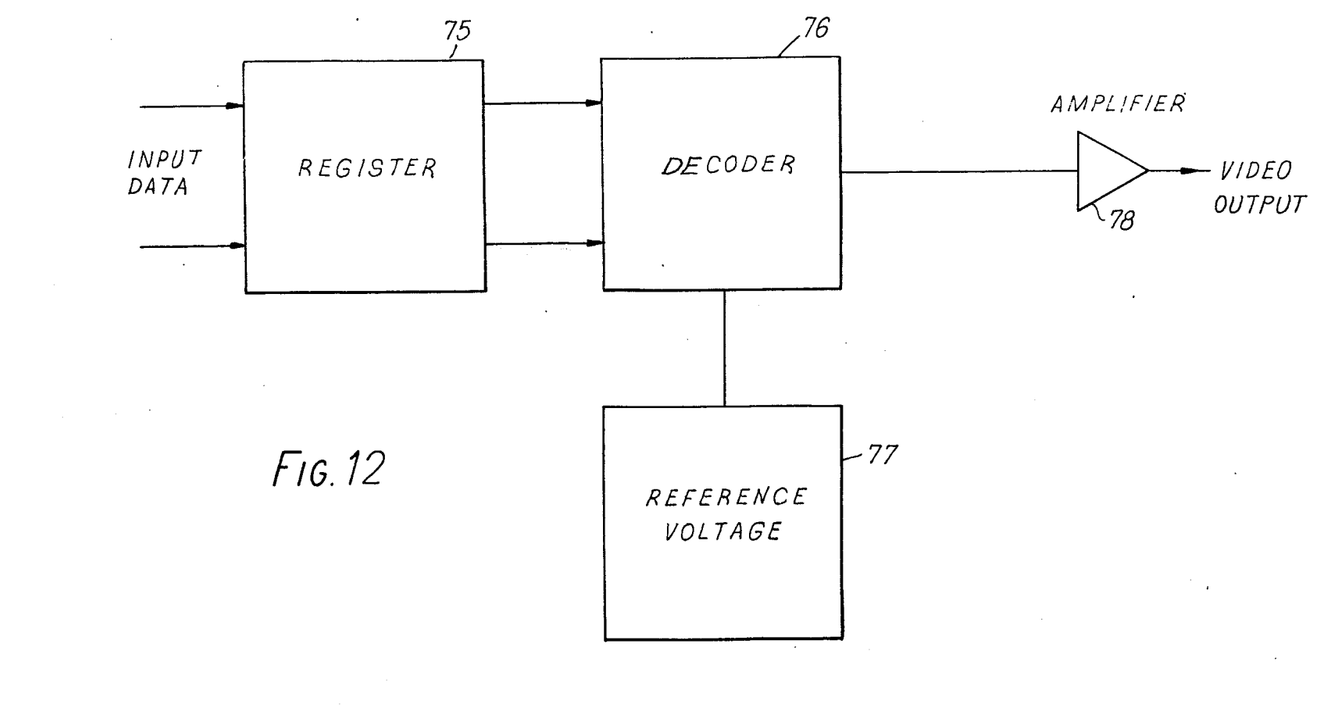
FIG. 12 is a diagram of a digital-to-analogue converter being an example suitable for use in the circuit of FIG. 4.

FIG. 12 shows the block diagram of a digital-to-analog converter suitable for use in this application. An alternative example forms the subject of our co-pending U.S. Pat. application no. 472,059. The digital data is applied to an input register 75 and is stored digitally. The output of the register is applied to a decoder 76 which converts the successive digital numbers into an analog representation of the digital numbers by resistors and switches in conjunction with a reference voltage 77. The analog output is fed to an amplifier 78 and provided at the output as a video signal. There are many forms of digital-to-analog converter which would be suitable for this particular application and this is an illustration of just one. The working of this unit may involve currents being passed through resistors each of which have a weighting value corresponding to the bit used in the analog-to-digital converter. The value of the resistors may be typically binary related. The switches allow the current in the resistors to be switched into or out of the amplifier.

Figure 13:
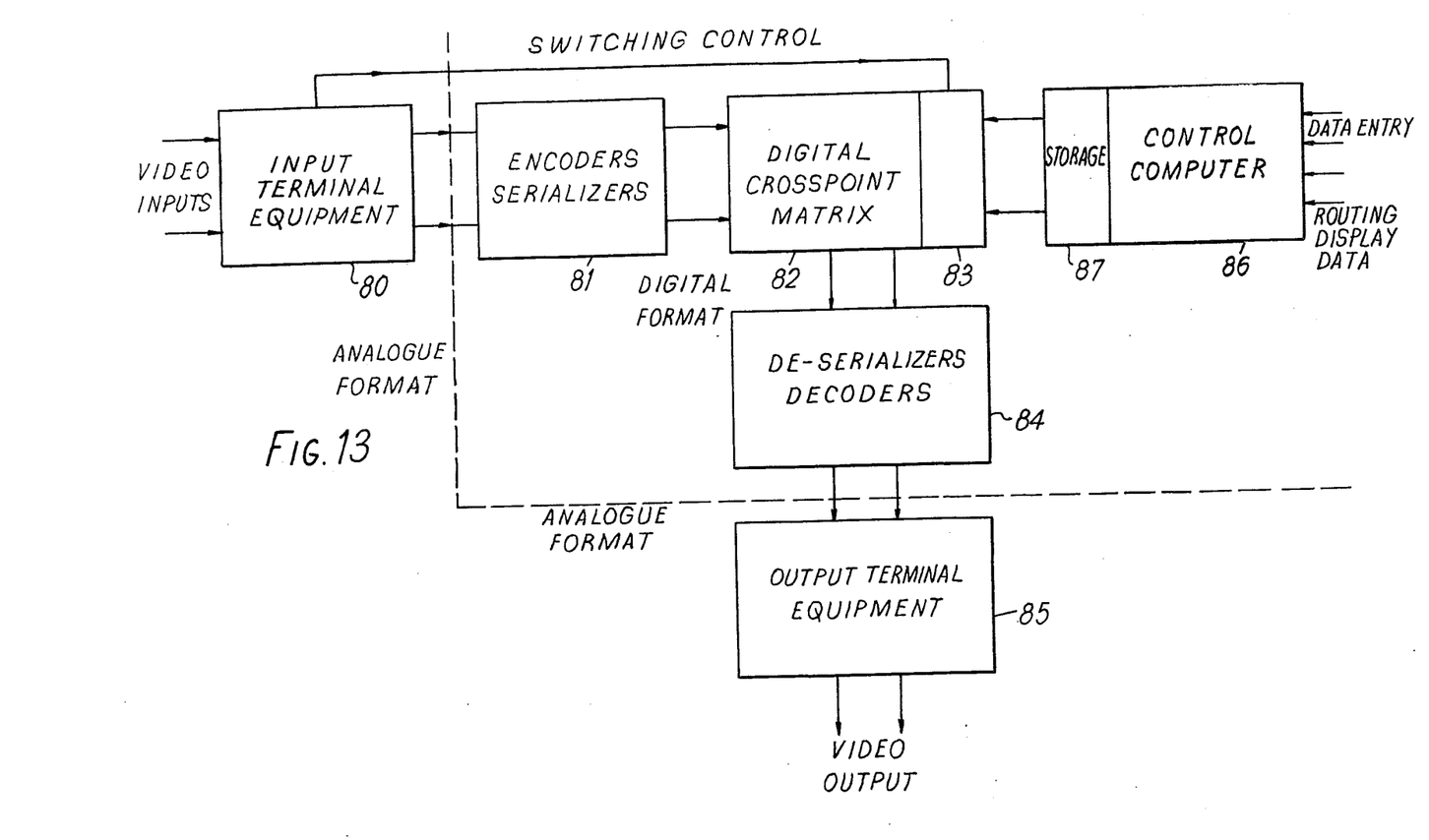
FIG. 13 shows an overall block diagram of the digital video assignment system including the cross-point switching matrix.

FIG. 13 shows a block diagram of the digital cross-point switching matrix from an overall point of view. The analog video inputs are applied to input terminal equipment 80 which incorporates the function such as:-
- A. Black level clamp
- B. Cable length equalizer
- C. Color sub-carrier phase equalizer
- D. Burst gate
- E. Phase-lock loop
- F. U axis, V axis pulse generator The output from the input termanal equipment is analogue in form and is applied to the encoders and serializers 81. The functions which would be incorported in this area are:-
- A. Sample Hold
- B. Analogue-to-Digital Converter
- C. Parallel-to-Serial Converter The output from this part of the equipment is digital in format and is applied to the digital cross-point matrix 82. This is controlled by an interface 83 which incorporates the addressing structure.

The output from the digital cross-point matrix is applied to the deserializers and decoders 84 which would incorporate:-
- A. Serial-to-Parallel Converters
- B. Digital-to-Analogue Converters The output terminal equipment 85 incorporates the functions:
- A. Distribution Amplifiers.
- B. Low pass filters
- C. Equalisers The equipment may be controlled by one of many means. One of the best methods of control available at present is a small digital computer. The digital computer 86 incorporates storage 87 such that the interface to the digital cross-point matrix may be updated into a large number of variations under the control of the digital computer.

A further control is necessary at the interface which is particularly associated with color television. This requires that the switching interval is coincident with the vertical interval in the television signal. The switching control line therefore detects this particular interval and allows the switching in the digital cross-point matrix to be coincident with that interval.

The description above covers the basic equipment used for a digital equipment assignment system. The advantages of the digital assignment system over an analog system are that it increases the ability to multiplex channels without cross talk.

The same system may be used to switch audio signals using digital techniques and thus providing an audio/video system which can pass through the same crosspoint. The basis of the digital audio assignment system is similar to that of a digital video assignment system without the requirement of operating at a very high bandwidth. It is therefore possible to interlace the audio signals with the video signals at the digital stage without substantially increasing the complexity of the equipment.

A basic audio assignment system will incorporate a precision analog-to-digital converter suitable for accepting audio signals. The digital data from the analog-to-digital converter will then be applied to the parallel-to-serial converter at a time when it is not accepting data from the video equipment. For television applications a suitable period would be that known as the Back Porch, Front Porch or sync pulse. The period required to transmit the audio signal is very short compared with that required to transmit the video signal and it is therefore easy to find places in the video signal where it may be placed without causing interference.

The data which provides information concerning the audio signal will incorporate an identifier code so that it may be identified at the deserializer and switched to a suitable digital-to-analog converter for reconstruction into the audio signal for use in conjunction with the video signal which is also passed through the same matrix.

The digital resolution of the equipment for video use may lie between 6 and 12 binary bits. The number of bits required depends on the quality of the signal which is to be transmitted. If the very highest quality signal is to be transmitted only once through the switching matrix then an 8 bit binary representation will accommodate the full studio quality required by television. If the signal is to be passed through the equipment several times then the resolution of the equipment could be increased to 10 or 12 binary bits.

The audio equipment will operate at a lower speed but will require a higher number of bits to resolve sound to a high fidelity. The sound analog-to-digital converter will require between 12 and 15 bits to produce the highest quality with an adequate signal-to-noise ratio.

The basis of the design above has been that the equipment operates through the cross-point with only a single digital data stream. Under some conditions it may be considered that a single digital data stream may be more conveniently replaced by 2 or perhaps more data streams so that the data rate through each stream is reduced. The reduction in data rate is at the expense of increased numbers of channels through the cross-point switching matrix. This aspect of the invention is incorporated and modification to both the serializer, cross-point matrix and the deserializer are required in order to accommodate it.

I Claim:
1. A video and audio signal assignment system for handling incoming signals having horizontal synchronizing pulse and colour burst information thereon said system comprising:
   a. a plurality of analog-to-digital converters for receiving and converting said incoming signals into digital form, b. a plurality of parallel-to-serial converters having their inputs connected to the outputs of the analog-to-digital converters for converting said signals into serial data, c. a digital cross-point switching matrix connected to the outputs of said parallel-to-serial converters;

d. a plurality of serial-to-parallel converters connected to said cross-point matrix for receiving said serial data;

e. a plurality of digital-to-analog converters connected to said serial-to-parallel converters;

f. a control device for enabling the connection between selected inputs and outputs of said matrix, g. burst detector means for detecting the colour burst information on said incoming video signals, h. clocking generator means determining the rate of conversion of said video signal into digital form, said clocking generator conversion rate being controlled by said detected colour burst signal, i. sync detector means for detecting the horizontal sync pulse information on the incoming video signal, j. switching means in said parallel to serial converter for including said detected cync pulse information into said serial data stream in a coded form, and k. coded sync detector means for detecting and retrieving the coded sync pulse information received by said serial-to-parallel converter.

2. An assignment system according to claim 1 wherein said parallel-to-serial converters each include an input register for storing the incoming parallel data from the analog-to-digital converters said switching means comprises a series of bistables each having one of their inputs connected to one of the register outputs and having their outputs connected via a series of further switches to a serial output, the other of said bistable inputs having a common connection for receiving the detected horizontal sync pulse, a delay line having a number of taps to provide a pulse at discrete intervals in time to each of said further switches, and a pulse generator for simultaneous control of said input register and delay line, said pulse generator producing a pulse on receipt of a signal from said clocking generator means.

3. An assignment sysem according to claim 1 wherein said serial-to-parallel converters each include a plurality of bistable having a common input receiving serialised data, a delay line having a plurality of outputs controlling said bistables respectively, said delay line outputs emitting pulses at discrete intervals of time determined by the delay line characteristics, and an output register capable of being up dated by the parallel data arriving from the bistables under the control of the delay line, and wherein said coded sync detector means is connected to the common input of said bistables.

4. An assignment system according to claim 1, wherein each analog-to-digital converter comprises a series of bits having respectively comparators and reference voltage means, each successive bit being capable of comparing an input signal with a reference voltage representing half the level of the preceding bit and wherein a sampled input signal entering the first bit is compared with its reference voltage representing half full scale deflection and is fed to the successive bits at a new level at each stage offset by the reference voltage of the preceding bit, each bit having a logic output to indicate when the signal level in the respective stage exceeds the reference voltage level.

5. An assignment system according to claim 1, wherein said digital cross-point switching matrix includes a plurality of parallel input lines, each line having a common connection to one of each of a series of AND gates, the outputs of one series of AND gates being connected respectively to a plurality of parallel output lines, and the outputs of the next and subsequent series of AND gates being connected respectively to said parallel output lines and a plurality of parallel address lines connected respectively to the second inputs of all said AND gates.

6. An assignment system according to claim 1, wherein said digital-to-analog converters each comprises an input register for digitally storing said parallel data, a decoder which converts the successive digital numbers into an analog representation of the digital numbers by resistors and switches.

7. An assignment system according to claim 1, wherein said analog-to-digital converters include a sample hold unit comprising an amplifier, a hot carrier diode bridge switch connected to said amplifier, a memory capacitor at the output of said switch, a further amplifier serving as a buffer for said memory capacitor and trigger pulse generating means controlling said switch, and wherein the occurrence of said trigger pulse is determined by said clocking generator means.

8. An assignment system according to claim 7, wherein said trigger pulse generating means includes a step recovery diode driven through a pulse transformer.

9. An assignment system according to claim 1, wherein a digital computer is provided which incorporates storage such that the interface to the digital cross-point switching matrix can be up dated into a large number of variations under the control of said computer.

10. An assignment system according to claim 9, wherein switching of said matrix takes place only during an interval coincident with a vertical synchronizing interval present on the incoming video signal, under the control of said interface receiving said vertical synchronizing information.

* * * * *